US012566998B2

(12) United States Patent
Ramamurthy et al.

(10) Patent No.: US 12,566,998 B2
(45) Date of Patent: Mar. 3, 2026

(54) SYSTEM, METHODS, AND PROCESSES FOR MODEL PERFORMANCE AGGREGATION

(71) Applicant: CERNER INNOVATION, INC., North Kansas City, MO (US)

(72) Inventors: Uttam Ramamurthy, Bangalore (IN); Ashwin Chhetri, Darjeeling (IN); Pankaj Saxena, Pune (IN); Rahul Jain V, Bangalore (IN)

(73) Assignee: CERNER INNOVATION, INC., Kansas City, MO (US)

( * ) Notice: Subject to any disclaimer, the term of this patent is extended or adjusted under 35 U.S.C. 154(b) by 834 days.

(21) Appl. No.: 17/811,765

(22) Filed: Jul. 11, 2022

(65) Prior Publication Data

US 2023/0206117 A1 Jun. 29, 2023

Related U.S. Application Data

(60) Provisional application No. 63/294,534, filed on Dec. 29, 2021.

(51) Int. Cl.
*G06N 20/00* (2019.01)
*G06F 11/34* (2006.01)
*G06N 5/02* (2023.01)

(52) U.S. Cl.
CPC ......... *G06N 20/00* (2019.01); *G06F 11/3447* (2013.01); *G06F 11/3428* (2013.01); *G06F 11/3495* (2013.01); *G06N 5/02* (2013.01)

(58) Field of Classification Search
CPC ...... G06N 20/00; G06N 5/02; G06F 11/3447; G06F 11/3495; G06F 11/3428
See application file for complete search history.

(56) References Cited

U.S. PATENT DOCUMENTS

| | | | |
|---|---|---|---|
| 7,225,103 B2 | 5/2007 | Beresniewicz et al. | |
| 7,644,438 B1 | 1/2010 | Dash et al. | |
| 9,521,035 B2 * | 12/2016 | Ganguly | H04L 41/0636 |
| 10,547,507 B2 * | 1/2020 | Guven | G06N 5/01 |

(Continued)

FOREIGN PATENT DOCUMENTS

| | | |
|---|---|---|
| CN | 110336889 A | 10/2019 |
| WO | 2021/064192 A1 | 4/2021 |

OTHER PUBLICATIONS

Tang, Liang, et al. "Optimizing system monitoring configurations for non-actionable alerts." 2012 IEEE Network Operations and Management Symposium. IEEE, 2012. (Year: 2012).*

(Continued)

*Primary Examiner* — Andrew L Tank
(74) *Attorney, Agent, or Firm* — Invoke

(57) ABSTRACT

Methods, systems, and computer-readable media are disclosed herein for a concurrent comparative tool for aggregating computationally generated performance reports a machine-learning data model pipeline for technological performance and/or predictive accuracy. The tool may acquire multiple performance measure reports that that quantitatively asses the performance of a model pipeline based on a configuration file that facilitates validation of the technological performance and predictive accuracy of the model. Additionally, when the conditions defined by the configuration file are met for of the performance measure reports the tool may broadcast a notification to a predetermined system.

20 Claims, 7 Drawing Sheets

(56)                References Cited

U.S. PATENT DOCUMENTS

| | | | | |
|---|---|---|---|---|
| 10,719,301 | B1 * | 7/2020 | Dasgupta | .................. G06F 8/34 |
| 11,537,506 | B1 * | 12/2022 | Dasgupta | ................. G06N 3/10 |
| 2009/0052329 | A1 * | 2/2009 | Mahajan | ............... G06F 40/143 |
| | | | | 370/242 |
| 2009/0106178 | A1 * | 4/2009 | Chu | ......................... G06N 5/02 |
| | | | | 706/14 |
| 2013/0132108 | A1 | 5/2013 | Solilov et al. | |
| 2013/0132551 | A1 | 5/2013 | Bose et al. | |
| 2013/0346594 | A1 | 12/2013 | Banerjee et al. | |
| 2017/0039530 | A1 * | 2/2017 | Natu | ..................... G06F 11/008 |
| 2017/0330058 | A1 * | 11/2017 | Silberman | ............. G06N 20/00 |
| 2018/0307586 | A1 | 10/2018 | Liu et al. | |
| 2019/0129395 | A1 * | 5/2019 | Niemiec | ............ G05B 23/0235 |
| 2020/0097847 | A1 * | 3/2020 | Convertino | .............. G06N 7/01 |
| 2021/0174258 | A1 | 6/2021 | Wenchel et al. | |
| 2021/0406671 | A1 * | 12/2021 | Gasthaus | ............ G06F 11/2263 |
| 2022/0108167 | A1 * | 4/2022 | Upadhyay | ............... G06F 3/061 |
| 2023/0105304 | A1 * | 4/2023 | Mandal | .............. G06F 18/2415 |
| | | | | 714/37 |

OTHER PUBLICATIONS

Yim, Keun Soo. "Evaluation metrics of service-level reliability monitoring rules of a big data service." 2016 IEEE 27th international symposium on software reliability engineering (ISSRE). IEEE, 2016. (Year: 2016).*

Witt, Carl, et al. "Predictive Performance Modeling for Distributed Computing using Black-Box Monitoring and Machine Learning." arXiv preprint arXiv:1805.11877 (2018). (Year: 2018).*

* cited by examiner

Figure 3:
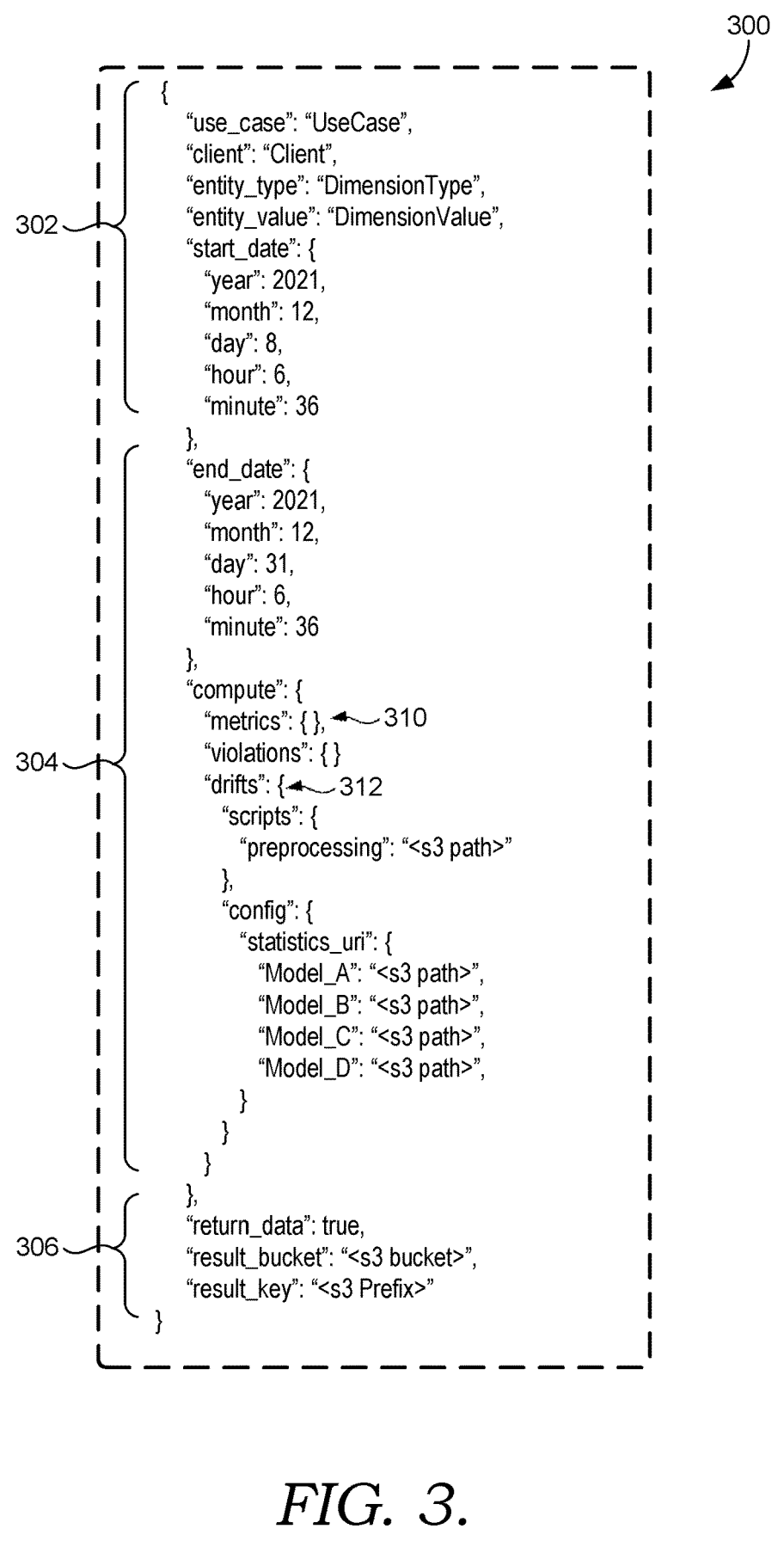

300

```
{
    "use_case": "UseCase",
    "client": "Client",
    "entity_type": "DimensionType",
    "entity_value": "DimensionValue",
    "start_date": {
        "year": 2021,
        "month": 12,
        "day": 8,
        "hour": 6,
        "minute": 36
    },
    "end_date": {
        "year": 2021,
        "month": 12,
        "day": 31,
        "hour": 6,
        "minute": 36
    },
    "compute": {
        "metrics": {},          ◄── 310
        "violations": {}
        "drifts": {             ◄── 312
            "scripts": {
                "preprocessing": "<s3 path>"
            },
            "config": {
                "statistics_uri": {
                    "Model_A": "<s3 path>",
                    "Model_B": "<s3 path>",
                    "Model_C": "<s3 path>",
                    "Model_D": "<s3 path>",
                }
            }
        }
    },
    "return_data": true,
    "result_bucket": "<s3 bucket>",
    "result_key": "<s3 Prefix>"
}
```

Figure 3A:
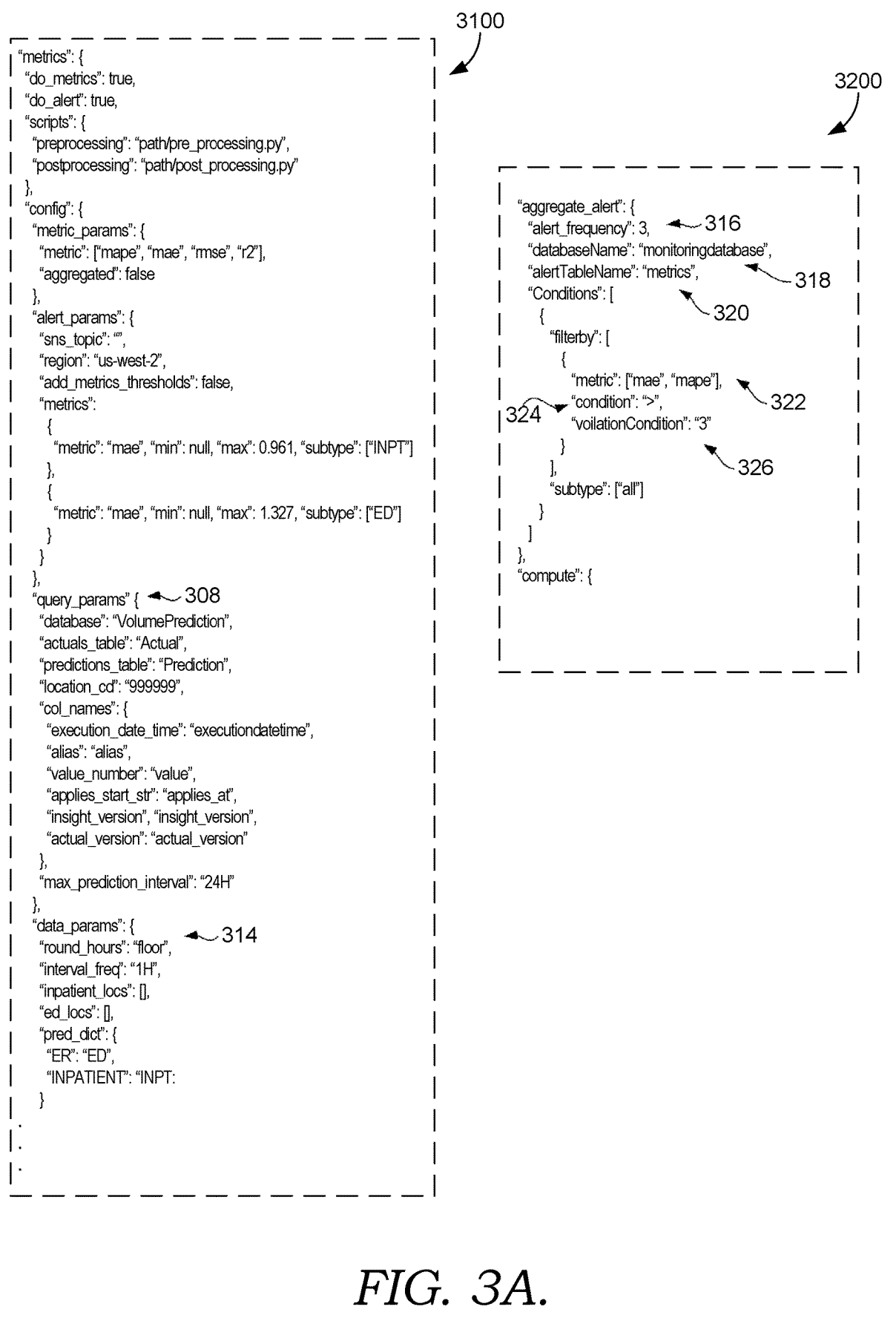

```
"metrics": {
  "do_metrics": true,
  "do_alert": true,
  "scripts": {
    "preprocessing": "path/pre_processing.py",
    "postprocessing": "path/post_processing.py"
  },
  "config": {
    "metric_params": {
      "metric": ["mape", "mae", "rmse", "r2"],
      "aggregated": false
    },
    "alert_params": {
      "sns_topic": "",
      "region": "us-west-2",
      "add_metrics_thresholds": false,
      "metrics":
        {
          "metric": "mae", "min": null, "max": 0.961, "subtype": ["INPT"]
        },
        {
          "metric": "mae", "min": null, "max": 1.327, "subtype": ["ED"]
        }
    }
  },
  "query_params" {          308
    "database": "VolumePrediction",
    "actuals_table": "Actual",
    "predictions_table": "Prediction",
    "location_cd": "999999",
    "col_names": {
      "execution_date_time": "executiondatetime",
      "alias": "alias",
      "value_number": "value",
      "applies_start_str": "applies_at",
      "insight_version", "insight_version",
      "actual_version": "actual_version"
    },
    "max_prediction_interval": "24H"
  },
  "data_params": {
    "round_hours": "floor",          314
    "interval_freq": "1H",
    "inpatient_locs": [],
    "ed_locs": [],
    "pred_dict": {
      "ER": "ED",
      "INPATIENT": "INPT:
    }
.
.
.
```

3200

```
"aggregate_alert": {
  "alert_frequency": 3,          316
  "databaseName": "monitoringdatabase",
  "alertTableName": "metrics",          318
  "Conditions": [          320
    {
      "filterby": [
        {
          "metric": ["mae", "mape"],          322
          "condition": ">",
   324    "voilationCondition": "3"
        }          326
      ],
      "subtype": ["all"]
    }
  ]
},
"compute": {
```

Alert Monitoring - Metrics - VolumePrediction for ClientA

Alert Details:
- Client Mnemonic: ClientA
- Entity: None
- SystemCategory: CapacityPrediction
- Subtypes checked: ED, INPATIENT
- Type: metrics
- State: alert
- Reason for State: Threshold crossed
- ExecutionTimestamp: Thursday 03 July, 2021 11:10:30 UTC
- Start Date: Thursday ...:00:00 UTC
 -End Date: Thursday ...:00:00 UTC
- Monitoring Version: v1.0.2
- Insight Version: v1
- Actual Version: None
- Baseline Version: v1

Monitoring Job
Start Date: Thursday 01 July, 2021 00:00:00 UTC
End Date: Thursday 02 July, 20021 00:00:00 UTC
*INPT
-mae: 8.035 value violated the Maximum metric threshold which is 0.933
*ED
-mae: 1.524 value violated the Maximum metric threshold which is 1.247

FIG. 4.

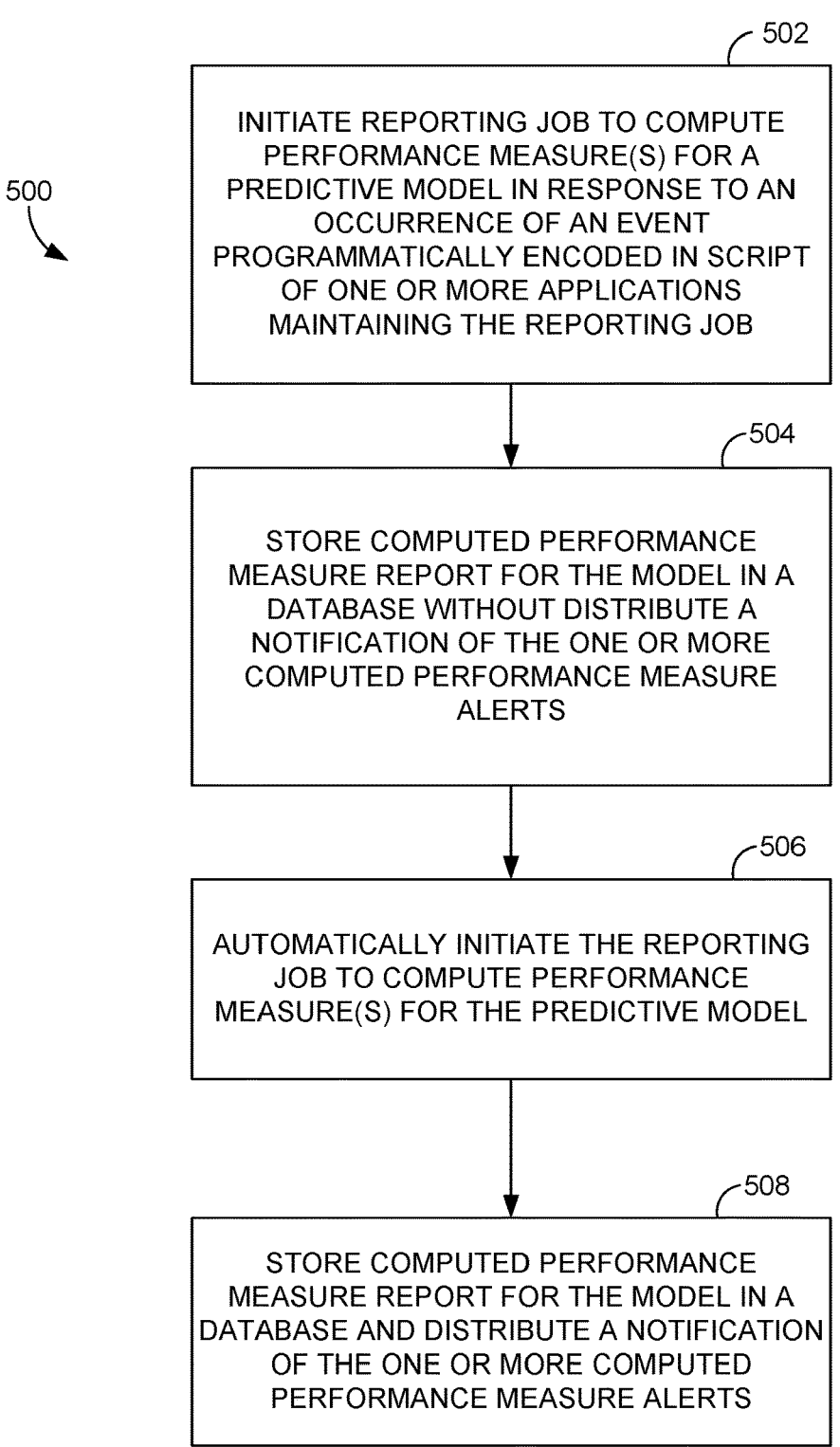

502

INITIATE REPORTING JOB TO COMPUTE PERFORMANCE MEASURE(S) FOR A PREDICTIVE MODEL IN RESPONSE TO AN OCCURRENCE OF AN EVENT PROGRAMMATICALLY ENCODED IN SCRIPT OF ONE OR MORE APPLICATIONS MAINTAINING THE REPORTING JOB

500

504

STORE COMPUTED PERFORMANCE MEASURE REPORT FOR THE MODEL IN A DATABASE WITHOUT DISTRIBUTE A NOTIFICATION OF THE ONE OR MORE COMPUTED PERFORMANCE MEASURE ALERTS

506

AUTOMATICALLY INITIATE THE REPORTING JOB TO COMPUTE PERFORMANCE MEASURE(S) FOR THE PREDICTIVE MODEL

508

STORE COMPUTED PERFORMANCE MEASURE REPORT FOR THE MODEL IN A DATABASE AND DISTRIBUTE A NOTIFICATION OF THE ONE OR MORE COMPUTED PERFORMANCE MEASURE ALERTS

*FIG. 5.*

SYSTEM, METHODS, AND PROCESSES FOR MODEL PERFORMANCE AGGREGATION

This non-provisional patent application claims priority benefit to provisional patent application No. 63/294,534, entitled "System, Methods, and Processes for Model Performance Aggregation," filed on Dec. 29, 2021, the entirety of which is incorporated by reference herein. This non-provisional application filed at the United States Patent and Trademark Office is related to non-provisional application entitled "System and Method for evaluating and deploying Data Models having improved Performance Measures," having application Ser. No. 17/811.781, filed on Jul. 11, 2022, co-pending non-provisional application entitled "Model Validation Based on Sub-Model Performance," having application Ser. No. 17/811,787, filed on Jul. 11, 2022, both filed contemporaneously with this non-provisional application, the entirety of which is incorporated by reference herein.

TECHNICAL FIELD

This application relates to machine-learning data models. More particularly, to comparative evaluation of prediction accuracy and performance measures of distinct versions of a machine-learning data model.

SUMMARY

Embodiments of the present disclosure relate to, among other things, methods, systems, and computer-readable media for aggregating computationally generated performance reports a machine-learning data model (hereinafter "model") pipeline for technological performance and/or predictive accuracy. As will be described, aspects of the invention discussed hereinafter monitor and comparatively evaluate technological performance and/or predictive accuracy by monitoring multiple sub-models of a model pipeline.

A first embodiment may include a computerized method for aggregating computed performance measure alerts within an executable reporting job. The method may include automatically initiating the executable reporting job to compute one or more performance measures for a predictive model in response to an occurrence of an event programmatically encoded in script of one or more applications maintaining the reporting job. In some embodiments, the reporting job includes operations that configure distribution of the computed performance measure alert output by the reporting job based on the predictive model. The computerized method may also include storing the one or more computed performance measure alerts for the model storing the one or more computed performance measure alerts for the model in a database without distributing a notification of the one or more computed performance measure alerts in response to execution of the reporting job's operations. Additionally, the computerized method may include automatically initiating the executable reporting job to compute another one or more performance measures for the predictive model and storing the other one or more computed performance measure alerts in the database and distributing a notification of both the one or more computed performance measure alerts and the other one or more computed performance measure alerts in response to the reporting job's execution of the operations.

Another embodiment may include a system for aggregating computed performance measures of a predictive model in an alert notification. The system may include at least one processor and computer storage media storing computer readable instructions. The computer readable instructions cause the processor to initiate a reporting job to compute one or more performance measures for a predictive model in response to an occurrence of an event programmatically encoded in script of one or more applications maintaining the reporting job. In some embodiments, the reporting job includes operations that configure distribution of the computed performance measure alert output by the reporting job based on the predictive model. The instructions may also cause the processor store the one or more computed performance measure alerts for the model in a database without distributing a notification of the one or more computed performance measure alerts responsive to execution of the reporting job's operations. The instructions may also cause the processor to automatically initiating the executable reporting job to compute another one or more performance measures for the predictive model and storing the other one or more computed performance measure alerts in the database and distributing a notification of both the one or more computed performance measure alerts and the other one or more computed performance measure alerts responsive to the reporting job's execution of the operations.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims as supported by the Specification, including the Detailed Description.

BRIEF DESCRIPTION OF THE DRAWINGS

The present systems and methods for aggregated alerts of computer model performance measures are described in detail below with reference to the attached drawing figures, wherein:

FIG. 3 depicts an example code schema of a configuration file to facilitate aggregated alert notifications of model pipeline performance measures, in accordance with some embodiments of the present disclosure;

FIG. 3A depicts an example code snippets for a configuration file, in accordance with some embodiments of the present disclosure;

FIG. 4 is an example aggregated alert notification including model pipeline performance measures, in accordance with some embodiments of the present disclosure;

FIG. 5 depicts an example method for condition-based distribution of aggregated alert notifications, in accordance with some embodiments of the present disclosure.

DETAILED DESCRIPTION

Figure 1:
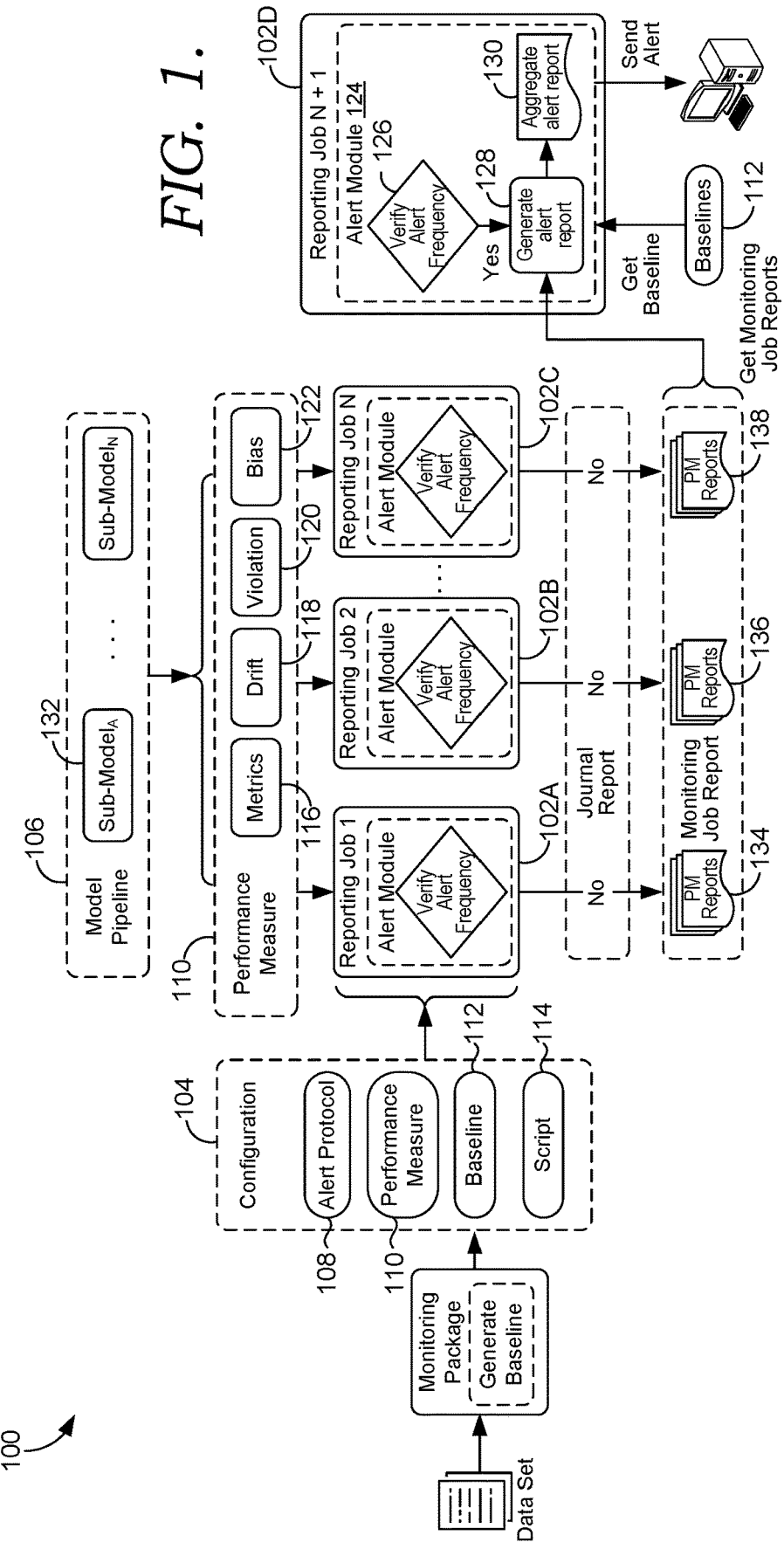
FIG. 1 depicts a process diagram illustrating an example process for aggregated alert notifications of model pipeline performance measures, in accordance with some embodiments of the present disclosure.

Computer based models are often used to predict future events using the currently available data. The performance of these models may be repeatedly evaluated during development and after deployment to facilitate continuous improvement and to ensure predictive accuracy and precision. At a high level, the predictive modeling of these dynamic or chaotic systems is sensitive to initial data conditions. For example, a computer model may predict weather patterns over the next day, week, or month, or a computer model may predict the admission rate of a patient care facility.

In such a situation, the dynamic or chaotic fluctuations in the data consumed by the model may result in predictive instability. This instability may be a temporary artifact or may reveal computational, training, data encoding, data decoding, or other technical deficiency of the model. In contrast to conventional approaches of model pipeline performance detection, the aspects described herein provide aggregating computationally generated performance reports a machine-learning data model (hereinafter "model") pipeline for technological performance and/or predictive accuracy.

Definitions

As used herein, the terms "observed data", "ground truth", "actuals", and "targets" are used interchangeably to refer to empirical data and/or observed real-world information encoded as data. For example, observed data includes measured, captured, or recorded values representing and/or quantifying an event or a variable for an outcome that has occurred. In one example, observed data includes a value for a total patient volume of a specific healthcare entity that occurred over a defined six month time period, as recorded in historical reporting data of the healthcare entity.

As used herein, the term "predictive data" refers to any and all data that is input to and output from a version of a data model. For example, predictive data can include input(s) such as training datasets that are ingested to generate and trigger output. Additionally or alternatively, predictive data can include output(s) generated or produced from the data model version, such as prediction(s) made by that the version of the data model using the input(s). Predictive data can also include metadata related to the data model, metadata related to the data version of the data model, metadata related to the sub-model input, and/or metadata related to the sub-model output. Predictive data can refer to other output of the data model version.

As used herein, the terms "model" and "data model" are used interchangeably to refer to a machine learning/artificial intelligence type of data model that is defined by algorithmic decision logic. A data model (and any version thereof) can include features such as decision logic, computational layers, neural networks, Markov chains, weighting algorithms (specific or non-specific to variables, values, layers, sub-models), and/or Random Forests. Although referred to in the singular, it will be understood that a data model (and any version thereof) can include a plurality of specific sub-models that operate together in a particular sequence or in parallel, for example, that contribute to output such as predictions.

As used herein, a "version", "sub-model version" and a "data model version" are used interchangeably to refer to a particular iteration of a data model having defined configurations for the input, operations of (e.g., decision logic), and/or output that are specific to or unique to that particular iteration.

As used herein, the terms "script" and "computer programming script" are used interchangeably to refer to computer-readable and -executable instructions/programming code that are an expression of instructions that cause, manage, and facilitate performance of a sequence of operational steps by a computer, in an automated or semi-automated manner.

As used herein "performance measures" refer to measurements captured that represent and quantify aspects of the technological performance and prediction accuracy (or inaccuracy) of a model version and/or other behavior. Performance measures can include, for example, metrics, prediction accuracy, bias, data drift, noise, variance, and the like. Examples of metrics include Measured Absolute Percentage Error (MAPE), Mean Absolute Error (MAE), and/or Root Mean Squared Error (RMSE).

Embodiments

With reference to FIG. 1, FIG. 1 is an example data flow diagram illustrating example process 100 for rule-based aggregation of computed performance measures alerts for a model pipeline. At a high level, the process 100 includes one or more reporting jobs computing performance measures of a model pipeline. The reporting job may include one or more programmatic modules that, amongst other things, consume alert parameters from a configuration file associated with the model pipeline. The alert parameters may set the conditions for the reporting job's broadcast of a performance measure report. For example, an alert module of the reporting job may use alert frequency parameters to check a database for performance measure reports that are associated with the model pipeline and have not been broadcast previously. In at least one embodiment, the alert module aggregates a plurality of performance measure reports into an aggregated alert message that is broadcast. Unlike conventional instantaneous alert procedures, the aggregate alert may validate model baselines with one or more previously generated performance measure reports. The broadcast of such a report may help reduce the unwanted and/or uninformative burden of instantaneous alert procedures, among other things.

Process 100 may include configuring a reporting job based on one or more configuration files. A configuration file 104 may be an object file that contains among other things, the metadata information, processing scripts, and output storage locations that facilitate the reporting job (e.g., $102_A$, $102_B$, $102_C$, $102_D$) to execute operations that may be required to retrieve/transform/merge/segregate the data identified in the output of model pipeline 106. For example, configuration file 104 may include query parameters (e.g., query_params of code 308 of FIG. 3A) that point to the location of other objects that facilitate extracting data from data output by model pipeline 106. For another example, the configuration file may include data parameters (e.g., data_params of code 314 of FIG. 3A) that point to objects that facilitate transforming the format of the extracted data to a reporting format.

In some embodiments, the configuration file 104 includes an aggregate alert key 108 that points to one or more objects that hold the parameters used by the alert module. The object may hold the parameters in a data schema that facilitates the configuration of the reporting job's alert module. For example, the data schema may include among others, parameters for the frequency of the alter aggregation (e.g., a value, range, or algorithm that defines how many instances of the reporting job are executed before or between alert aggregation evaluation), the location of one or more databases (e.g., database 204 of FIG. 2) storing the performance measure reports associated with the model pipeline 106, and/or the identity of one or more tables in the database(s) associated with the performance measure reports. With brief reference to FIG. 3A, example code 3200 depicts a portion of code in accordance to some embodiments of the alert schema. For example, code 3200 includes an alert frequency parameter 316. As depicted, parameter 316 is defined as requiring 3 instances of the reporting job's execution prior to triggering the aggregated alert computational operations. Parameter 316 may be checked by the reporting job in any number of ways. For example, the reporting job 102A may include a counter that incrementally increases during each execution instance. For another example, reporting job 102A may read the database location identified by the database-Name parameter 318 and the table identified by the alert-TableName parameter 320 to compute the number of performance measure reports (e.g., 134, 136, 138) stored in the database and/or database table.

Additionally, the data schema may include parameters for one or more performance measures. For example, the data schema may include a parameter for each of one or more metrics 116, drift 118, violation 120, and/or bias 122 performance measures computed by the reporting job 102. For each of the performance measures, the data schema may include one or more conditions that define the rule(s) for triggering an alert aggregation. Returning briefly to FIG. 3A, example code 3200 includes an example performance measure parameter for metric parameter 322 and condition parameters 324 and 326. As depicted, metric parameter 322 defines the alert aggregation applies to MAE and MAPE for performance measure reports generated by the reporting job. Additionally, metric parameter 322 also defines that at least 3 alert events must be present in the performance reports to trigger distribution of an aggregated alert. The values and parameters depicted in code 3200 are merely examples and are not limiting. Other values, parameters, rules and schemas are contemplated.

As depicted, the process 100 also includes one or more reporting jobs (e.g., 102$_A$) outputting performance measure reports (e.g., PM reports 134). The PM report 134 may include the computational result of the reporting job. To facilitate the generation of the PM report 134, the reporting job may load configuration file 104 and ingest one or more outputs from the model pipeline 106 and/or the corresponding one or more sub-models (e.g., sub-model$_A$ 132). Accordingly, the configuration file may include query parameters, data parameters, scripts, and performance measures that facilitate extracting data from the one or more outputs, computing the performance measurements, and transforming the format of the extracted data to a reporting format.

Bias measures 122 are generally performance measures that computational quantify the weight and/or representation of data elements based on the training data. As biased data may result in skewed prediction outcomes, detecting bias at a sub-model level may facilitate identification and/or localization of some types of programmatic and/or data errors in a model pipeline.

In calculating the Bias for a model or sub-model, predictions from insight features real time data are analyzed with a bias baseline created with the training data. The baselines is generated using training data containing features and its prediction values. This helps to generate an outcome. This outcome may be a comprehensive report describing the feature level bias progression of data with respect to the baseline over the time.

Pre training bias (evaluates features with actual label) and post training bias (evaluates features with actuals & predictions label values) are supported in some embodiments. For example, once model pipeline data (actual) has been evaluated, the model monitoring system loads a pre-processing file and baseline files into the system and executes the pre-processing algorithm to get the model insight features and actuals. The data may then be analyzed with baseline files using bias & configured metrics to calculate any pre-training bias. In another example, once model pipeline data (actual & predictions) has been evaluated, the model monitoring system loads a pre-processing file and baseline files into the system and executes the pre-processing algorithm to get the model insight features and actuals. The data may then be analyzed with baseline files using bias & configured metrics to calculate any post-training bias.

Drift measures 118 are generally performance metrics that computational quantify occurrences of unexpected or undocumented changes to the structure or semantics of data consumed by and/or generated by the sub-model. As drift events may corrupt the predictive model or break computational operations, detecting drift at a sub-model level may facilitate identification and/or localization of some types of programmatic deficiencies in a model pipeline.

In an example drift calculation, model features are analyzed with baselines created from the training data. In the exemplary drift calculation, statistical information of model data with respect to the baseline data is retrieved. The drift calculation may then identify any drift present for the features within the model. Additionally, the drift calculation may operate to analyze multiple models with a respective baseline for each model. For multiple models, a baseline file may exist for each model and the features for each model may be mapped to the respective model baseline for each model.

A violation measures when a threshold and/or baseline is violated. For example, the feature of the model version and the particular performance measure for which the violation occurs, the expected value(s) and/or target value(s) of the violated baseline and/or threshold, the value of the performance for which the violation was determined, and the like. Additionally, features within the model or sub-model are analyzed with baselines created from training data. During the analysis of the model, the occurrence of any new features or missing features in the model data are captured. For any valid features in the model data, the data is analyzed with the baseline to capture any datatype mismatch, positive, negative, and non-zero variations or violations.

For example, the performance measures may include area under the curve (AUC), receiver operating characteristic (ROC), precision, variance, covariance, and/or other similar quantitative measures. Similarly, the performance measures may include the mean, median, r$^2$, standard deviation, percentile, and/or other similar quantitative measures.

Generally, a metric measure 116 includes analytical comparisons of the sub-model's predictive reliability. For example, a configuration file may include a metric of Measured Absolute Percentage Error (MAPE), Mean Absolute Error (MAE), or Root Mean Squared Error (RMSE), or a combination thereof for one or more sub-models. MAPE may be generally expressed in the following example, though other expressions of MAPE are contemplated to be within the scope of aspects discussed herein:

$$MAPE = \frac{100 \ \%}{n} \sum_{t=1}^{n} \left| \frac{A_t - F_t}{A_t} \right| \qquad (1)$$

Generally, MAE may be expressed in the following example, though other expressions of MAE are contemplated to be within the scope of aspects discussed herein:

$$MAE = \frac{\sum_{i=1}^{n} |F_i - A_i|}{n} = \frac{\sum_{i=1}^{n} |e_i|}{n} \tag{2}$$

RMSE, generally, is the standard deviation of the prediction error. As such, it may be expressed in the following example, though other expressions of RMSE are contemplated to be within the scope of the aspects discussed herein:

$$RMSE = \sqrt{\frac{\sum_{i=1}^{n} (A_i - F_i)^2}{n}} = \sqrt{(f - o)^2} \tag{3}$$

In the example expressions above, A refers to the observed data; F refers to the prediction based on the input data. The configuration file 104 may also include one or more baseline thresholds 112 associated with the performance measurements for the model pipeline 106 and/or each applicable sub-model (e.g., sub-model$_A$ 132). In general, one or more baseline value(s) define an expected value to be predicted for a variable or event by a model version based on specified and known inputs. Therefore, a baseline 'expected' value can be used to determine whether a model version produced the same or similar value in a prediction for that variable. Accordingly, the baseline values can be used to evaluate prediction accuracy of the model pipeline 106, versions of model pipeline 106, one or more sub-models (e.g., sub-model$_A$ 132), and/or versions of the one or more sub-models in comparison to such expected values. The baseline thresholds 112 can be a target value that is a customized and/or predated minimum or maximum for gauging and evaluating performance measures, for example, such as metrics (e.g., MAPE, MAE, and/or RMSE). Baseline values can further include ranges, for example, to determine whether a model pipeline or sub-model produced a prediction value that is or is not within a predefined buffer range of the baseline expected value for the corresponding variable. Additionally or alternatively, the baseline thresholds 112 can define values for evaluating other performance measures such as data drift, model bias, and/or noise, for example. The comparisons and determinations for each performance measure evaluated in view of the baselines thresholds, for each model, are included in the performance reports 134, 136, and 138.

The process 100 also includes a reporting job (e.g., 102$_A$) executing an alert module. The alert module may be configured by the reporting job, as discussed above, using the alert key 108. For example, the reporting job 102$_A$ may check whether the conditions for an aggregated alert are met using one or more frequency parameters (e.g., parameter 316 of FIG. 3). If, as depicted for reporting job 102$_A$, the frequency parameters are not met, the reporting job 102$_A$ may generate a performance measure report 134, as discussed above. Alternatively, if the frequency parameters are met (e.g., such as for reporting job 102$_D$), the module triggers the reporting job to pull the previous performance measure reports within the aggregate alert time frequency. In some embodiments, the reporting job will verify the performance measures included in the previous performance measure reports the summarized report against the baseline 112 to generate an aggregate alert report 130. The aggregate alert report 130 may be broadcast via a network to one or more predefined locations or user accounts. For example, the aggregate alert example report 400 of FIG. 4 may be broadcast as an email, notification, or any other electronic message to a user account associated with a person tasked with maintaining the model pipeline 106.

Figure 2:
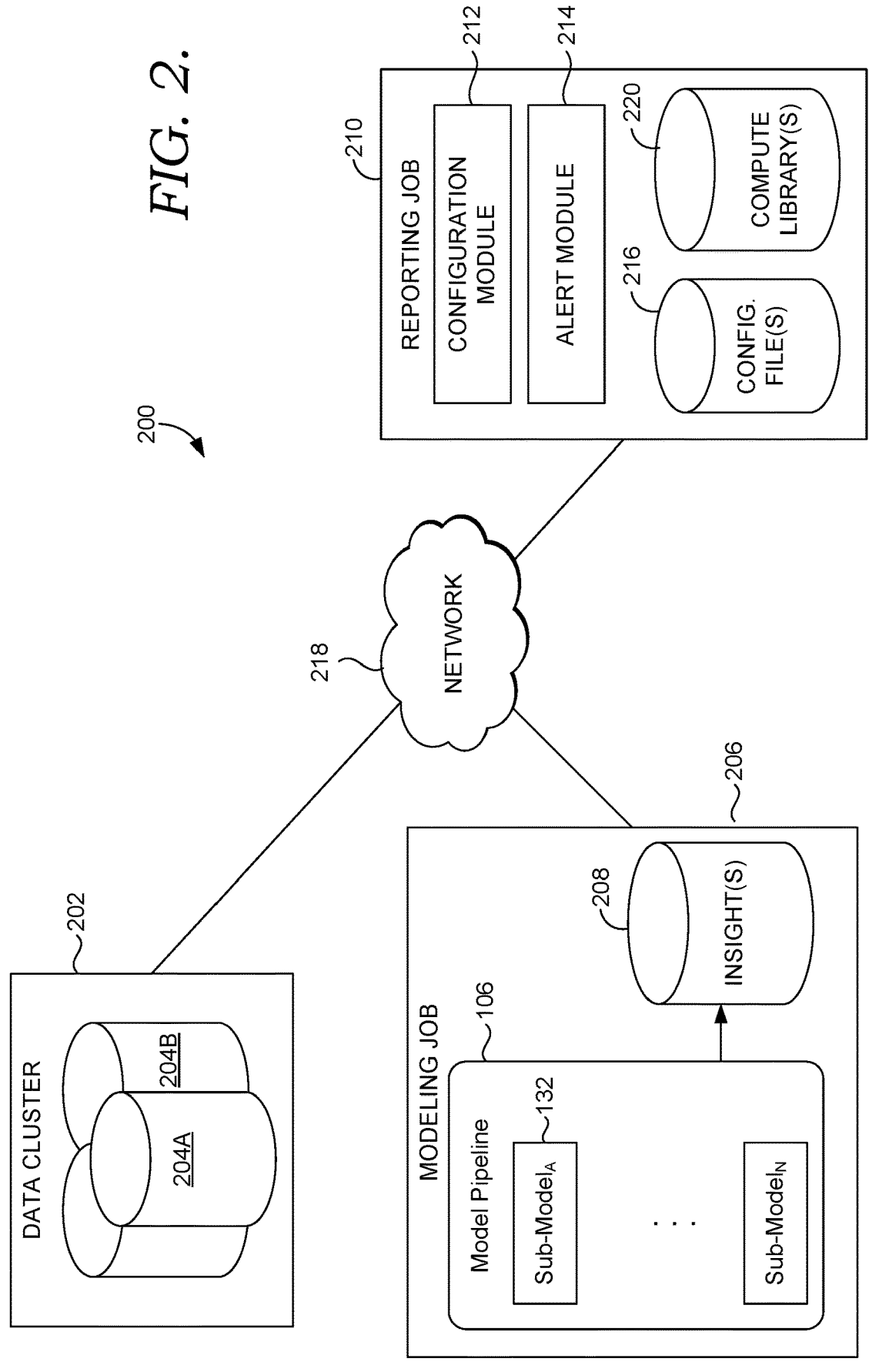
FIG. 2 depicts an example system environment that may facilitate aggregated alert notifications of model pipeline performance measures, in accordance with some embodiments of the present disclosure.

Turning to FIG. 2, FIG. 2 depicts an example system environment 200, in accordance with embodiments described herein. The block components of system environment 200 comprises computing processes and/or components that may include any combination of hardware, firmware, and/or software. For example, system environment 200 may include one or more devices described in relation to computing environment 600 of FIG. 6.

As depicted in FIG. 2, system environment 200 includes one or more databases of a data cluster 202. The data cluster 202 may maintain structured and unstructured data in one or more relational databases (e.g., database 204A or database 204B). The data may relate to any chaotic and/or dynamic system. For example, the data may comprise values, comments, records, and the like corresponding to a plurality of people. As the people interact with the one or more entities maintain the data cluster 202, additional data may be modified (e.g., added to, edited, removed, or in any other way manipulated) in the databases. For example, the data may be continuously, intermittently, and/or periodically modified as patients associated with the data are treated, seen, discharged, or otherwise interact with the institution, care network, or region that maintains the data cluster 202. The data may be generated by sensors that monitor the patient (e.g., heart rate and/or weight), data about the patient (e.g., admission date and/or demographics), and/or observations about the patient (e.g., diagnosis of disease or condition). The data at a first point in time may be used by a model pipeline (e.g., model pipeline 106) to predict an outcome at a future point in time. The data may then be modified as time proceeds from the first point in time to the future point in time. The data held in the data cluster 202 may, at the future time point, be used to determine an observed outcome corresponding to the earlier predicted outcome.

The system environment 200 also includes a modeling job 206 including a model pipeline 106 and one or more sub-models (e.g., sub-model$_A$ 132). Modeling job 206 may include programmatic expressions that execute model pipeline 106 continuously, intermittently, and/or periodically. The modeling job 206 may also include programmatic expressions that generate one or more outputs corresponding to model pipeline 106. For example, the modeling job 206 may output one or more insights 208 in a database. In some embodiments, insight 208 are one or more object files (e.g., a JavaScript Object Notation file) that capture metadata related to the model pipeline 106, the one or more sub-models, and/or the observed data.

The system environment 200 also includes a reporting job 210. Reporting job 210 may include programmatic expressions that compute performance measure reports continuously, intermittently, and/or periodically. For example, reporting job 210 may include among other things, configuration module 212, alert module 214, and configuration file database 216. Some embodiments of reporting job 210 may also include compute library 220 that maintains computational rules and algorithms that may be called by one or more configuration files 104. These modules may facilitate aggregated alert notifications of performance measures corresponding to a model pipeline. For example, the reporting job 210 may be programed to activate configuration model 212 in response to output from model pipeline 106. Upon activation, configuration module 212 may access insight 208 and identify a configuration file 104 held in a configuration database 216. Although depicted as part of reporting job 210, database 216 may be part of data cluster 202 in some embodiments.

The configuration file 104 may be one or more object files (e.g., a JavaScript Object Notation file). The configuration file 104 may include object oriented expressions related to the model pipeline 106, the one or more sub-models (e.g., sub-models $102_A$-$102_D$), and/or one or more performance measures 110. For example, configuration file 104 may be in a data schema 300 such as is depicted in FIG. 3. The data schema 300 may include, among other things, include the metadata information (e.g., code 302), performance measurement(s) (e.g., code 304), and output storage locations (e.g., code 306) that facilitate the reporting job 210 to execute operations that may be required to retrieve/transform/merge/segregate the data identified in insight 208. As depicted in FIG. 3A, data schema 300 may include or call programmatic expressions. For example, metric measures that may include code such as example code that includes MAE metric measures. Similarly, data schema 300 may include one or more drift measures that may include code such as example code 7012 and/or example code 708. The data schema 700 may similarly include one or more violation measures and/or one or more bias measures. Additionally, data schema 300 may include one or more alert key(s). For example, data schema 300 may include programmatic expressions like example code 3200. The alert key(s) may be configured as an independent expression of the schema 300 or may be embedded in one or more performance measurements. This may facilitate incorporation of performance measurement specific aggregate alert rules and/or job specific aggregation alert rules.

The system environment 200 also includes a network 218. The network 218 may include wireless and/or physical (e.g., hardwired) connections. Exemplary networks include a telecommunications network of a service provider or carrier, Wide Area Network (WAN), a Local Area Network (LAN), a Wireless Local Area Network (WLAN), a cellular telecommunications network, a Wi-Fi network, a short range wireless network, a Wireless Metropolitan Area Network (WMAN), a Bluetooth® capable network, a fiber optic network, or a combination thereof. The network 218, generally, provides the components and devices access to the Internet and web-based applications. Although not depicted, the system environment may also include a reporting dashboard that facilitates an interactive presentation of the computed performance measure reports.

Turning to FIG. 5, FIG. 5 depicts a method 500 for computing performance measures of sub-models, in accordance with embodiments described herein. Each block of method 500, described herein, comprises a computing process that may be performed using any combination of hardware, firmware, and/or software. For instance, various functions may be carried out by a processor executing instructions stored in memory. The method 500 may also be embodied as computer-usable instructions stored on computer storage media. The method 500 may be provided by a standalone application, a service or hosted service (standalone or in combination with another hosted service), or a plug-in to another product, to name a few. In addition, method 500 is described, by way of example, with respect to the process 100 of FIG. 1 and/or system 200 of FIG. 2. However, this method may additionally or alternatively be executed by any one system, or any combination of systems, including, but not limited to, those described herein.

The method 500, at block 502, includes automatically initiating an executable reporting job to compute one or more performance measures for a predictive model. The reporting job may be initiated in response to an occurrence of an event programmatically encoded in script of one or more applications maintaining the reporting job. In some embodiments, the reporting job includes operations that configure distribution of the computed performance measure alert output by the reporting job based on the predictive model. For example, reporting job $102_A$ may be initiated in response to detection of one or more outputs from model pipeline 106.

The method 500, at block 504, includes storing the one or more computed performance measure alerts for the model in a database without distributing a notification of the one or more computed performance measure alerts in response to the execution of the reporting job's operation. For example, the reporting job $102_A$ may be configured using a configuration file 104 to ingest and compute performance measure 110 based on the output from model pipeline 106. An alert module (e.g., alert module 214 of FIG. 2) of the reporting job $102_A$ may execute the operations defined by alert key 108. Where the conditions of the aggregated alert are not satisfied the reporting job $102_A$ completes computation and storage of PM report 134. However, reporting job $102_A$ does not distribute an aggregated alert report.

The method 500, at block 506, includes automatically initiating the executable reporting job to compute another one or more performance measures for the predictive model. Similar to block 502, the reporting job may be initiated in response to an occurrence of an event programmatically encoded in script of one or more applications maintaining the reporting job. In some embodiments, the reporting job includes operations that configure distribution of the computed performance measure alert output by the reporting job based on the predictive model. For example, reporting job $102_D$ may be initiated in response to detection of one or more outputs from model pipeline 106. The reporting job may be the same reporting job as initiated at block 502, a different reporting job, or another instance of the same reporting job as initiated at block 502. Said another way, reporting job $102_D$ may be 1) reporting job $102_A$ executed at a later point in time, 2) a different reporting job that computes other performance measures for model pipeline 106, or 3) another instance of reporting job $102_A$ executed in series or parallel.

The method 500, at block 508, includes storing the other one or more computed performance measure alerts in the database and distributing a notification of both the one or more computed performance measure alerts and the other one or more computed performance measure alerts in response to the execution of the reporting job's operation. For example, the reporting job $102_D$ may be configured using a configuration file 104 to ingest and compute performance measure 110 based on the output from model pipeline 106. An alert module (e.g., alert module 214 of FIG. 2) of the reporting job $102_D$ may execute the operations defined by alert key 108. Where the conditions of the aggregated alert are satisfied the reporting job $102_D$ completes computation of the performance measure report for the model pipeline. Additionally, reporting job $102_D$ distributes an aggregated alert report 130 based on the other programmatically defined rules of alert key 108.

In some embodiments of method 500, the method may repeat block 502 and 504 until the conditions of the alert key of the reporting job are met. The method 500 may then proceed to block 508.

Figure 6:
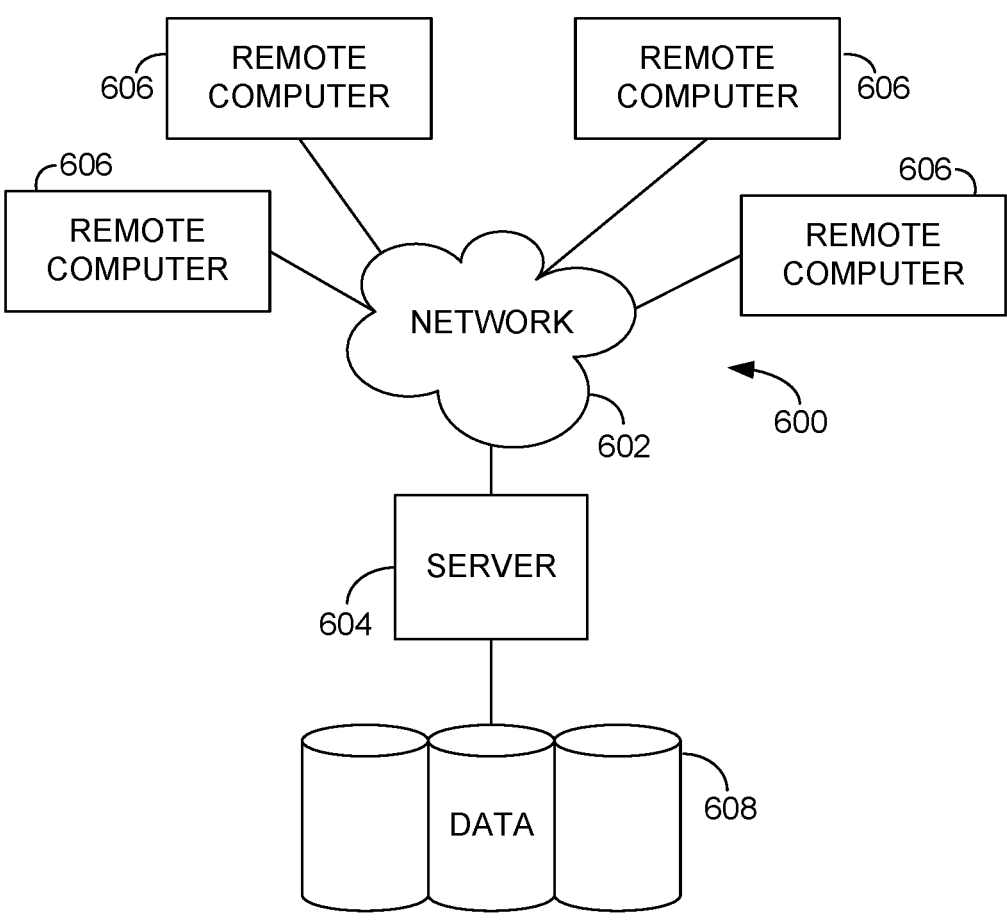
FIG. 6 depicts a block diagram of an example environment suitable to implement aspects embodiments of the present disclosure.

Turning to FIG. 6, an exemplary computing environment is depicted, in accordance with an embodiment of the present invention. It will be understood by those of ordinary skill in the art that the example computing environment 600 is just one example of a suitable computing environment and is not intended to limit the scope of use or functionality of the present invention. Similarly, the computing environment 600 should not be interpreted as imputing any dependency and/or any requirements with regard to each component and combination(s) of components illustrated in FIG. 6. It will be appreciated by those having ordinary skill in the art that the connections illustrated in FIG. 6 are also exemplary as other methods, hardware, software, and devices for establishing a communications link between the components, devices, systems, and entities, as shown in FIG. 6, may be utilized in implementation of the present invention. Although the connections are depicted using one or more solid lines, it will be understood by those having ordinary skill in the art that the exemplary connections of FIG. 6 may be hardwired or wireless, and may use intermediary components that have been omitted or not included in FIG. 6 for simplicity's sake. As such, the absence of components from FIG. 6 should be not be interpreted as limiting the present invention to exclude additional components and combination(s) of components. Moreover, though devices and components are represented in FIG. 6 as singular devices and components, it will be appreciated that some embodiments may include a plurality of the devices and components such that FIG. 6 should not be considered as limiting the number of a device or component.

Continuing, the computing environment 600 of FIG. 6 is illustrated as being a distributed environment where components and devices may be remote from one another and may perform separate tasks. The components and devices may communicate with one another and may be linked to each other using a network 602. The network 602 may include wireless and/or physical (e.g., hardwired) connections. Exemplary networks include a telecommunications network of a service provider or carrier, Wide Area Network (WAN), a Local Area Network (LAN), a Wireless Local Area Network (WLAN), a cellular telecommunications network, a Wi-Fi network, a short range wireless network, a Wireless Metropolitan Area Network (WMAN), a Bluetooth® capable network, a fiber optic network, or a combination thereof. The network 602, generally, provides the components and devices access to the Internet and web-based applications.

The computing environment 600 comprises a computing device in the form of a server 604. Although illustrated as one component in FIG. 6, the present invention may utilize a plurality of local servers and/or remote servers in the computing environment 600. The server 604 may include components such as a processing unit, internal system memory, and a suitable system bus for coupling to various components, including a database or database cluster. In some embodiments, data cluster takes the form of a cloud-based data store, and in some embodiments is accessible by a cloud-based computing platform. The system bus may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA®) local bus, and Peripheral Component Interconnect (PCI) bus, also known as Mezzanine bus.

The server 604 may include or may have access to computer-readable media. Computer-readable media can be any available media that may be accessed by server 604, and includes volatile and nonvolatile media, as well as removable and non-removable media. By way of example, and not limitation, computer-readable media may include computer storage media and communication media. Computer storage media may include, without limitation, volatile and non-volatile media, as well as removable and non-removable media, implemented in any method or technology for storage of information, such as computer-readable instructions, data structures, program modules, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by the server 604. Computer storage media does not comprise transitory signals per se.

Communication media typically embodies computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

In embodiments, the server 604 uses logical connections to communicate with one or more remote computers 606 within the computing environment 600. In embodiments where the network 602 includes a wireless network, the server 604 may employ a modem to establish communications with the Internet, the server 604 may connect to the Internet using Wi-Fi or wireless access points, or the server may use a wireless network adapter to access the Internet. The server 604 engages in two-way communication with any or all of the components and devices illustrated in FIG. 6, using the network 602. Accordingly, the server 604 may send data to and receive data from the remote computers 606 over the network 602.

Although illustrated as a single device, the remote computers 606 may include multiple computing devices. In an embodiment having a distributed network, the remote computers 606 may be located at one or more different geographic locations. In an embodiment where the remote computers 606 is a plurality of computing devices, each of the plurality of computing devices may be located across various locations such as buildings in a campus, medical and research facilities at a medical complex, offices or "branches" of a banking/credit entity, or may be mobile devices that are wearable or carried by personnel, or attached to vehicles or trackable items in a warehouse, for example.

In some embodiments, the remote computers 606 is physically located in a medical setting such as, for example, a laboratory, inpatient room, an outpatient room, a hospital, a medical vehicle, a veterinary environment, an ambulatory setting, a medical billing office, a financial or administrative office, hospital administration setting, an in-home medical care environment, and/or medical professionals' offices. By way of example, a medical professional may include physicians; medical specialists such as surgeons, radiologists, cardiologists, and oncologists; emergency medical technicians; physicians' assistants; nurse practitioners; nurses; nurses' aides; pharmacists; dieticians; microbiologists; laboratory experts; genetic counselors; researchers; veterinarians; students; and the like. In other embodiments, the remote computers 606 may be physically located in a non-medical setting, such as a packing and shipping facility or deployed within a fleet of delivery or courier vehicles.

Continuing, the computing environment 600 includes a data store 608. Although shown as a single component, the data store 608 may be implemented using multiple data stores that are communicatively coupled to one another, independent of the geographic or physical location of a memory device. Exemplary data stores may store data in the form of artifacts, server lists, properties associated with servers, environments, properties associated with environments, computer instructions encoded in multiple different computer programming languages, deployment scripts, applications, properties associated with applications, release packages, version information for release packages, build levels associated with applications, identifiers for applications, identifiers for release packages, users, roles associated with users, permissions associated with roles, workflows and steps in the workflows, clients, servers associated with clients, attributes associated with properties, audit information, and/or audit trails for workflows. Exemplary data stores may also store data in the form of electronic records, for example, electronic medical records of patients, transaction records, billing records, task and workflow records, chronological event records, and the like.

Generally, the data store 608 includes physical memory that is configured to store information encoded in data. For example, the data store 608 may provide storage for computer-readable instructions, computer-executable instructions, data structures, data arrays, computer programs, applications, and other data that supports the functions and action to be undertaken using the computing environment 600 and components shown in exemplary FIG. 6.

In a computing environment having distributed components that are communicatively coupled via the network 602, program modules may be located in local and/or remote computer storage media including, for example only, memory storage devices. Embodiments of the present invention may be described in the context of computer-executable instructions, such as program modules, being executed by a computing device. Program modules may include, but are not limited to, routines, programs, objects, components, and data structures that perform particular tasks or implement particular abstract data types. In embodiments, the server 604 may access, retrieve, communicate, receive, and update information stored in the data store 608, including program modules. Accordingly, the server 604 may execute, using a processor, computer instructions stored in the data store 608 in order to perform embodiments described herein.

Although internal components of the devices in FIG. 6, such as the server 604, are not illustrated, those of ordinary skill in the art will appreciate that internal components and their interconnection are present in the devices of FIG. 6. Accordingly, additional details concerning the internal construction device are not further disclosed herein.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including handheld devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A computerized method for aggregating computed performance measure alerts, the computerized method comprising:

automatically initiating, via one or more hardware processors, a first instance of an executable reporting job to compute a first set of one or more performance measures for a predictive model, the executable reporting job initiated in response to an occurrence of an event programmatically encoded in a script associated with one or more applications, and the first instance of the executable reporting job outputting a first set of one or more performance measure alerts corresponding to the first set of one or more performance measures for the predictive model;

storing the first set of one or more performance measure alerts in a database;

automatically initiating a second instance of the executable reporting job to compute a second set of one or more performance measures for the predictive model, the second instance of the executable reporting job (a) initiated prior to distributing any notification of the first set of one or more computed performance measure alerts and (b) outputting a second set of one or more performance measure alerts corresponding to the second set of one or more performance measures for the predictive model;

storing the second set of one or more performance measure alerts in the database; and based on the storing of the first set of one or more performance measure alerts and the second set of one or more performance measure alerts, distributing a notification of both the first set of one or more performance measure alerts and the second set of one or more performance measure alerts.

2. The computerized method of claim 1, wherein the executable reporting job computes a plurality of performance measures including the first set of one or more performance measures, and wherein the first set of one or more performance measures includes at least one measure of an item selected from a group comprising a model metric, a model drift, a model bias, and a model violation.

3. A system for aggregating computed performance measures of a predictive model in an alert notification, the system having one or more hardware processors configured to facilitate a plurality of operations, the operations comprising:

automatically initiating, via the one or more hardware processors, a first instance of an executable reporting job to compute a first set of one or more performance measures for a predictive model, the executable reporting job initiated in response to an occurrence of an event programmatically encoded in a script associated with one or more applications, and the first instance of the executable reporting job outputting a first set of one or more performance measure alerts corresponding to the first set of one or more performance measures for the predictive model;

storing the first set of one or more performance measure alerts in a database;

automatically initiating a second instance of the executable reporting job to compute a second set of one or more performance measures for the predictive model, the second instance of the executable reporting job (a) initiated prior to distributing any notification of the first set of one or more computed performance measure alerts and (b) outputting a second set of one or more performance measure alerts corresponding to the second set of one or more performance measures for the predictive model;

storing the second set of one or more performance measure alerts in the database; and based on the storing of the first set of one or more performance measure alerts and the second set of one or more performance measure alerts, distributing a notification of both the first set of one or more performance measure alerts and the second set of one or more performance measure alerts.

4. The system of claim 3, wherein the executable reporting job is further configured to compute a plurality of performance measures including the first set of one or more performance measures.

5. The system of claim 3, wherein the first set of one or more performance measure alerts includes one or more generated performance measure reports.

6. The system of claim 3, wherein the first set of one or more performance measures includes at least one measure of an item selected from a group comprising a model metric, a model drift, and a model bias.

7. The system of claim 3, wherein the first set of one or more performance measures includes at least one measure of a model violation.

8. One or more non-transitory media having computer-readable instructions that when executed by one or more hardware processors cause the one or more hardware processors to facilitate a plurality of operations, the operations comprising:

automatically initiating, via one or more hardware processors, a first instance of an executable reporting job to compute a first set of one or more performance measures for a predictive model, the executable reporting job initiated in response to an occurrence of an event programmatically encoded in a script associated with one or more applications, and the first instance of the executable reporting job outputting a first set of one or more performance measure alerts corresponding to the first set of one or more performance measures for the predictive model;

storing the first set of one or more performance measure alerts in a database;

automatically initiating a second instance of the executable reporting job to compute a second set of one or more performance measures for the predictive model, the second instance of the executable reporting job (a) initiated prior to distributing any notification of the first set of one or more computed performance measure alerts and (b) outputting a second set of one or more performance measure alerts corresponding to the second set of one or more performance measures for the predictive model;

storing the second set of one or more performance measure alerts in the database; and based on the storing of the first set of one or more performance measure alerts and the second set of one or more performance measure alerts, distributing a notification of both the first set of one or more performance measure alerts and the second set of one or more performance measure alerts.

9. The one or more non-transitory media of claim 8, wherein the executable reporting job is further configured to compute a plurality of performance measures including the first set of one or more performance measures.

10. The one or more non-transitory media of claim 8, wherein the first set of one or more performance measure alerts includes one or more generated performance measure reports.

11. The one or more non-transitory media of claim 8, wherein the first set of one or more performance measures includes at least one measure of a model metric.

12. The one or more non-transitory media of claim 8, wherein the first set of one or more performance measures includes at least one measure of a model drift.

13. The one or more non-transitory media of claim 8, wherein the first set of one or more performance measures includes at least one measure of a model bias.

14. The one or more non-transitory media of claim 8, wherein the first set of one or more performance measures includes at least one measure of a model violation.

15. The one or more non-transitory media of claim 8, wherein executing the first instance of the executable reporting job configures a distribution of the first set of one or more performance measure alerts, and wherein the first set of one or more performance measure alerts is distributed based on the configuration of the distribution by the first instance of the executable reporting job.

16. The one or more non-transitory media of claim 8, wherein executing the first instance of the executable reporting job cause a detectable quantity, indicative of a number of automatically-initiated instances of the executable reporting job, to be changed in response to each automatically-initiated instance of the executable reporting job, and wherein the notification of both the first set of one or more performance measure alerts and the second set of one or more performance measure alerts is distributed in response to the detectable quantity matching a threshold value.

17. The one or more non-transitory media of claim 16, wherein the detectable quantity corresponds to a quantity of performance measure alerts stored in the database, and wherein the quantity of performance measure alerts incrementally increases with each initiated instance of the executable reporting job.

18. The one or more non-transitory media of claim 16, wherein the detectable quantity corresponds to a stored value of a counter.

19. The one or more non-transitory media of claim 18, wherein the stored value is incrementally increased during each instance of the executable reporting job.

20. The one or more non-transitory media of claim 16, wherein the detectable quantity is stored in the database and is updated in response to each automatically-initiated instance of the executable reporting job.

* * * * *